(12) United States Patent
Yarnold et al.

(10) Patent No.: US 8,730,033 B2
(45) Date of Patent: May 20, 2014

(54) METHOD AND SYSTEM FOR SENDING INFORMATION FROM A USER DEVICE TO A CAR

(75) Inventors: Christina Yarnold, Decatur, GA (US); Mike Peterson, Atlanta, GA (US)

(73) Assignee: HTI IP, L.L.C., Atlanta, GA (US)

( * ) Notice: Subject to any disclaimer, the term of this patent is extended or adjusted under 35 U.S.C. 154(b) by 606 days.

(21) Appl. No.: 13/029,985

(22) Filed: Feb. 17, 2011

(65) Prior Publication Data

US 2012/0044089 A1 Feb. 23, 2012

Related U.S. Application Data

(60) Provisional application No. 61/305,455, filed on Feb. 17, 2010.

(51) Int. Cl.
*G08B 1/08* (2006.01)
(52) U.S. Cl.
USPC ... 340/539.13; 340/901; 340/988; 455/426.1; 705/6
(58) Field of Classification Search
USPC ............ 340/539.1, 539.11, 539.13, 901, 902, 340/988; 455/426.1; 705/6
See application file for complete search history.

(56) References Cited

U.S. PATENT DOCUMENTS

| | | | | |
|---|---|---|---|---|
| 7,840,427 B2* | 11/2010 | O'Sullivan | ....................... | 705/6 |
| 2006/0059023 A1* | 3/2006 | Mashinsky | ....................... | 705/5 |
| 2007/0069890 A1* | 3/2007 | Tuck | ....................... | 340/539.13 |
| 2009/0172009 A1* | 7/2009 | Schmith et al. | ............... | 707/102 |
| 2009/0312012 A1 | 12/2009 | Tieman et al. | | |
| 2010/0293303 A1 | 11/2010 | Choi | | |
| 2011/0004401 A1 | 1/2011 | Rothschild | | |
| 2011/0121991 A1* | 5/2011 | Basir | ........................... | 340/902 |
| 2011/0145089 A1* | 6/2011 | Khunger et al. | ............. | 705/26.4 |

\* cited by examiner

*Primary Examiner* — Brent Swarthout
(74) *Attorney, Agent, or Firm* — John L. Doughty

(57) ABSTRACT

A telematics server manages meeting request messages sent from, and to, a vehicle-coupled device. The server performs authentication services when a subscriber logs in to the server from the vehicle-coupled device, or with a device associated with the subscriber's telematics services account. Upon login, the server may append a session identifier to the request message. After the message passes through the server, an application running on a device remote from the vehicle receives the request message and accepts user input that permits the remote device to transmit its current location to the vehicle-coupled device in a confirmation message according to the session identifier. The telematics server can use the session identifier to determine the destination address of the vehicle-coupled device to forward the confirmation message to. The vehicle-coupled device displays the remote device location on a map. The request and confirmation messages may include a media content file.

9 Claims, 4 Drawing Sheets

FIG. 4

| SUBSCRIBER NAME | SUBSCRIBER UNIQUE ID | VIN | CONTACT INFO (CAR) | ACCOUNT # | PASSWORD | FINANCIAL # |
|---|---|---|---|---|---|---|
| $SUB_1$ | E-MAIL $SUB_1$ | $VIN_1$ | $IMEI_1$ | ACCOUNT #1 | $PW_1$ | ACCOUNT #1 |
| $SUB_2$ | E-MAIL $SUB_2$ | $VIN_2$ | $IMEI_2$ | ACCOUNT #2 | $PW_2$ | ACCOUNT #2 |
| ● | ● | ● | ● | ● | ● | ● |
| ● | ● | ● | ● | ● | ● | ● |
| ● | ● | ● | ● | ● | ● | ● |
| $SUB_n$ | E-MAIL $SUB_n$ | $VIN_n$ | $IMEI_n$ | ACCOUNT #n | $PW_n$ | ACCOUNT #n |
| 20 | 22 | 24 | 26 | 28 | 30 | 32 |

METHOD AND SYSTEM FOR SENDING INFORMATION FROM A USER DEVICE TO A CAR

CROSS REFERENCE TO RELATED APPLICATIONS

This application claims priority under 35 USC sec. 119 to U.S. Provisional Patent Application 61/305,455 having a filing date of Feb. 17, 2010, which this application incorporates herein by reference in its entirety.

FIELD

The invention relates to transmitting information from a user device to an in-vehicle device that has a user interface.

BACKGROUND

Telematics devices facilitate connecting a vehicle with a communications network. A telematices control unit ("TCU") installed in a vehicle typically comprises a global positioning satellite ("GPS") circuit, or module, wireless communication circuitry, including long range wireless (cellular telephony and data services) and short range wireless ("BlueTooth") capabilities. A TCU typically includes at least one processor that controls, operates, and manages the circuitry and software running thereon, and also facilitates interfacing with a vehicle data bus.

For example, a TCU installed by a vehicle's original equipment manufacturer ("OEM") such as Ford, Toyota, BMW, Mercedes Benz, etc., typically couples directly to the corresponding vehicle's data bus, such as, for example, a controller area network ("CAN") bus, an international standards organization ("ISO") bus, a Society of Automotive Engineers ("SAE") bus, etc. The TCU can process and communicate information retrieved from the bus via links of the wireless communication networks, to a user's mobile device local to the vehicle, or a computer device remote from the vehicle. An OEM typically cautiously guards access by third party software to a vehicle's bus through a TCU because of the potential of computer virus infection, other malware, and software and data that although innocuous may nonetheless interfere with operation of the vehicle, which could expose the OEM to warranty liability and other liability.

SUMMARY

A central host telematics server provides gatekeeper functions in forwarding location messages to and from a TCU coupled to a vehicle bus. In one aspect, a user remote from a vehicle wants the driver, typically a subscriber of telematics services associated with the vehicle to drive to the remote user. The remote user may generate a request message with a smartphone, PC, or other similar device running third party software. Preferably, the remote user's device includes a global positioning satellite ("GPS"). When equipped with a GPS module, the remote user's device can send its current location information in a request message that requests the subscriber, or driver, to drive to the remote user's current location. A third party application running on the remote user's device sends the request message to the car (TCU, or device coupled to the vehicle) according to an identifier of the vehicle or coupled device, such as a special e-mail address that the operator of the TOS may issue (for example, the e-mail address may have a domain name that the TOS uses for internet connectivity) or an SMS number, an IMEI number, an IP address, a MAC address, or other similar information known in the art to identify a device. The TOS performs database operations and locates a record that corresponds to the identifier associated with the subscriber sent in the request message. One will appreciate that the TOS may locate a plurality of records because a given subscriber of telematics services offered by the operator of the TOS may own multiple vehicles that can receive and perform telematics services with the TOS. Thus, the TOS can send a request message to all vehicle devices associated with a telematics subscriber's user name or account number, for examples. When the vehicle device receives the request message, the driver/subscriber may perform an act, such as pressing a button to open a voice channel, or data channel, and receive request messages that someone may have sent to them or to their vehicle device. A given message typically contains the name of the remote user who sent the request (or at least the remote user's device name) and the location coordinates of the remote user's device when it sent the message. The receiving device (TCU or subscriber device coupled to the vehicle) typically displays the message and location coordinates on a map display using either a head unit display integrated into the vehicle, a portable wireless device display that is coupled to the TCU or subscriber's wireless device, or the subscriber's wireless device itself may display the location information using mapping software.

In another aspect, the remote user who initiates the request can attach media content, such as an audio file, an image file, or a video file the request message. The application running on the remote user's device may attach a file already stored on it, or it may record the media file substantially simultaneously with the initiating of the request to meet message and send it along with the location information/coordinates of the remote user's device.

In another aspect, the subscriber/driver may desire to drive to a certain individual's location. For example, a driver may contact a friend, realize the friend is in the general vicinity of the driver, and they may decide to meet each other at the friend's location. The driver, using a TCU and any display and/or user device coupled to it or the vehicle's bus, sends a request message to the remote user's device's identifier, such as e-mail or SMS number. One will appreciate that when the driver/subscriber's vehicle device transmits a message from the TCU, the subscriber has typically authenticated himself, or herself, to the TOS server with login credentials, such as a user name and password. The TOS receives the request message and forwards it, perhaps as an e-mail message or an SMS message, to the friend's user device, such as a smartphone. The TOS includes the identity of the subscriber in the request message. When the friend's user device receives the request message, the message causes an application running on the friend's device to query whether he, or she, wishes to transmit his, or her, current location information to the requesting subscriber/driver. If the friend responds with their user device in the affirmative, the user device transmits its current location information to the TOS. A third party software program running on the TOS may interface with a complementary application running on the remote user's device. The third party software running on the TOS may package the confirmation message received from the remote user's device (the subscriber's friend's device) into a message that includes the remote user's identity and location information. This can create an extra layer between the friend's device and the telematics services operator's server which provides an added level of security of the friend's location and identity in case he, or she, does not wish the subscriber/driver that initiated meet request to know the friend's location. Alternatively, the friend's device can send a confirmation message that includes the friend's device's location information to the TOS directly, which would then forward the friend's location information to the driver/subscriber vehicle device.

In an aspect, the driver/subscriber can authenticate himself, or herself, at a first device remote from their vehicle, such as a PC in his home or office, but the TOS sends the friend's location information to the subscriber's vehicle device rather than the PC in the home. However, if the initiating device is the subscriber smartphone, for example, which the subscriber may tether or otherwise couple to his vehicle, the TOS would typically return the confirmation message from the friend to the initiating device. A telematics table at the TOS typically associates the subscriber's preferred receiving device with his, or her, telematics number, or other telematics account identifier.

BRIEF DESCRIPTION OF THE DRAWINGS

FIG. 3 illustrates a flow diagram of a method for requesting the location of a user device to drive to.

FIG. 4 illustrates a telematics table that associates various information with a telematics subscriber's account.

DETAILED DESCRIPTION

As a preliminary matter, it will be readily understood by those persons skilled in the art that the present aspects are susceptible of broad utility and application. Many methods, embodiments, aspects, and adaptations other than those herein described, as well as many variations, modifications, and equivalent arrangements, will be apparent from or reasonably suggested without departing from the substance or scope described herein.

Accordingly, while a detailed description in relation to preferred embodiments has been given, it is to be understood that this disclosure is only illustrative and exemplary and is made merely for the purposes of providing a full and enabling disclosure. The following disclosure is not intended nor is to be construed to limit or to exclude other embodiments, adaptations, variations, modifications and equivalent arrangements, the present invention being limited only by the claims appended hereto and the equivalents thereof.

Figure 1:
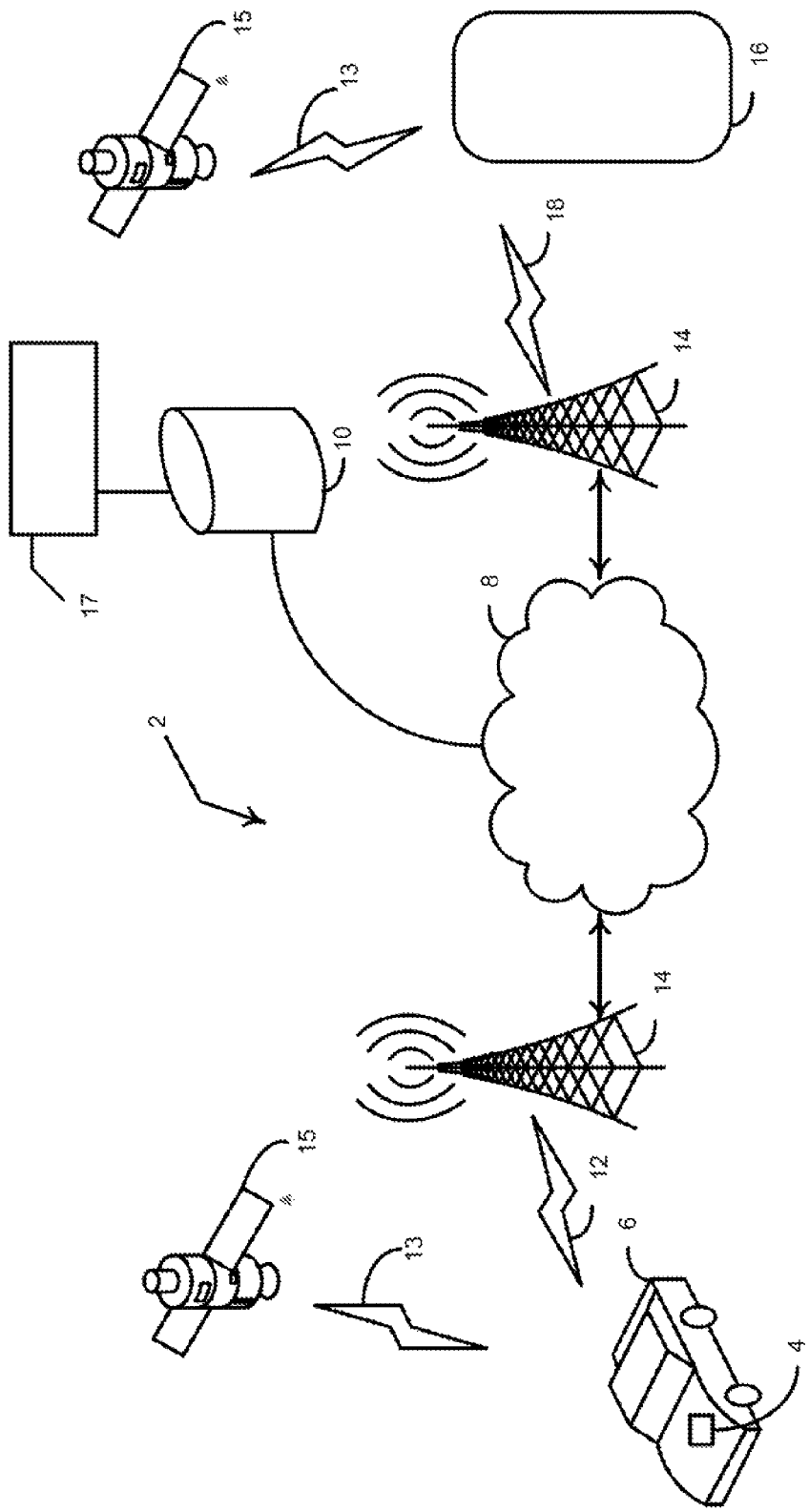
FIG. 1 illustrates a system for communicating between user devices and a device in a vehicle over a communication network.

FIG. 1 illustrates a system 2 for providing telematics services. A telematics control unit ("TCU") 4 located in vehicle 6 uses communications components to communicate over communication network 8 with a telematics services provider's telematics operations center ("TOC") 10. This document may also refer to TOC as telematics operations server ("TOS") 10. TOC/TOS 10 may include computer servers coupled to communication network 8, and may also include call center personnel that can respond to voice and data requests transmitted from TCU 4 to the TOC. TCU 4 communicates over wireless links 12 with wireless towers 14 coupled to communications network 8. Links 12 and towers 14 may be cellular, GPRS, Bluetooth, or other similar wireless communication systems and protocols. TOC 10 typically maintains a subscriber table that associates each of a plurality of subscribers with corresponding TCU devices and vehicle identification numbers ("VIN") if the corresponding vehicles. Subscriber table 17 may also associate a financial account number, such as a credit card account or checking account, of a subscriber with the subscriber's telematics account. Thus, subscriber table 17 typically associates a subscriber's user name with an account number, a financial account number, one or more vehicle's VINs and corresponding TCUs. FIG. 4 illustrates a more detailed structure of table 17.

Table 17 shows a subscriber name field 20. The user names may be user selectable names to identify themselves, and to use for log in/authentication purposes. Table 17 associates a subscriber's unique identifier 22, such as an e-mail address, an SMS number, or other similar identification. Also, Table 17 associates a subscriber's vehicle's VIN 24 and the vehicle's telematics device identifier 26 (e.g., IMEI) with the subscriber's name 20 and telematics services account number 28. Password field 30 associates a subscriber's password with user name 20 for use in authenticating a subscriber to TOS 10 shown in FIG. 1. Continuing with FIG. 4, table 17 associates a financial account number 32 of a given subscriber with the subscriber's authentication information. This can be used to grant or deny telematics services based on information associated with account 28 that indicates corresponding subscriber 20 has paid their subscription fee. If not, the user can easily authorize payment of the subscription fee from associated account 32. Thus, TOS 10 can perform gate keeping functions related to the methods described below in denying service to a delinquent subscriber, as well as only permitting information and data received at the TOS that originates from a remote device that is destined to a unique identifier associated with a current subscriber to proceed to TCU 4. Accordingly, TOS 10 can perform services, such as virus scan, malware detection, etc. of information and data before forwarding it on to TCU 4, which is typically coupled directly to a vehicle's data/diagnostic bus/communication network.

Returning to discussion of FIG. 1, TCU 4 includes various intercoupled electronic and electrical components. TCU 4 typically includes a main processor 16 that performs operations such as voice compression, video processing, application processing, and overall management of the TCU. TCU 4 may also comprise an application running on a smartphone that is tethered to a device that interfaces with the vehicle's 6 diagnostic/communication bus (CAN, IEEE, ISO, etc.) and the smartphone may also couple with an interface, such as a touch screen substantially permanently installed in the vehicle. The smartphone/TCU may couple to the vehicle via a cable, or via a short range wireless link. TCU 4 typically includes a means, such as a button or voice command sensor, to facilitate a user activating a voice channel session over a long range wireless link between the TCU and a wireless network, such as a cellular telephony network. When a user activates a voice channel, TCU 4 may also generate and transmit a request for any messages than another user device remote from the vehicle 6 may have transmitted to the vehicle, and the TCU therein. The TCU typically transmits the request message over the long range wireless link to TOC 10, which also typically receives messages, and related content, from the remote device.

A remote user device 16 (remote in relation to vehicle 6 also may couple with network 8 via long range wireless link 18. The figure shows satellite 15, link 13, tower 14 with the same reference numbers as the same components that facilitate communication with TCU 4. However, system 2 may use different components to facilitate communication with remote user device 16 based upon the locations of device 16 and TCU 4. Remote user device 16 may include a smartphone, a wired PC, a wireless laptop computer, a wireless tablet device, or other similar device that a user can use to communicate wirelessly with an internetwork, such as the internet.

Figure 2:
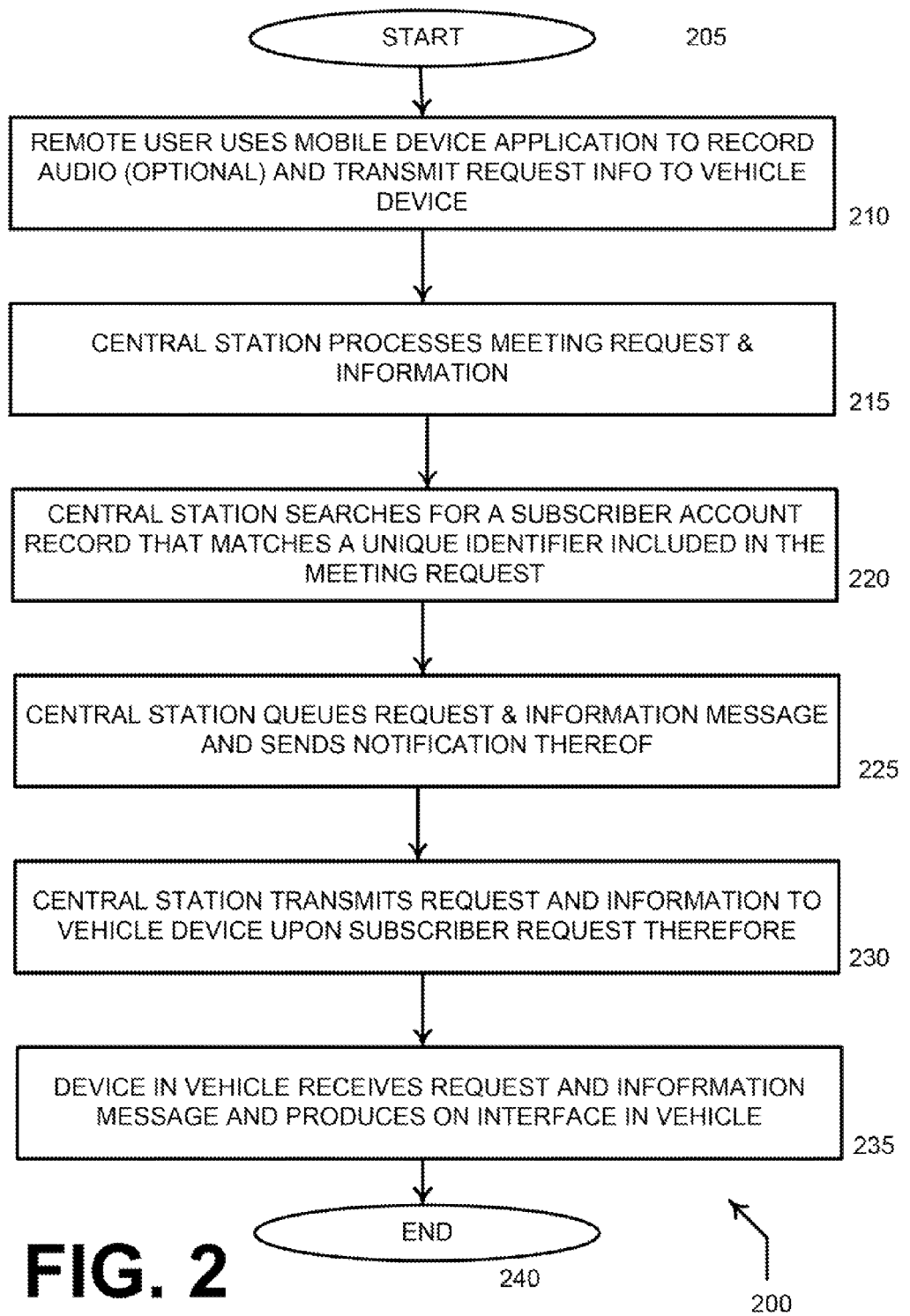
FIG. 2 illustrates a flow diagram of a method for processing a request and information message sent from a user device remote from a vehicle to the vehicle.

Turning now to FIG. 2, the figure illustrates a flow diagram of a method 200 for processing a request and information message that a user device remote from a vehicle sends to the vehicle. The remote user device may include any one of a variety of devices, including, but not limited to, a smartphone, a PC, a tablet PC, a personal safety device, such as a wearable pendant or bracelet, or any other similar computing device that includes a wireless transceiver coupled to a processor and that facilitates a user interface for entering a current location and for attaching a media content message, such as an audio file, with a message before it sends it to the vehicle. Method 200 starts at step 205. At step 210, a user of the remote device uses it to generate a message that requests that the driver of a vehicle drive to the remote user. The user device can present a request-message-generating-application that allows the user thereof to enter a name, attach an image, and even to attach an audio message file that already exists on the user device, or that the user can record substantially contemporaneously with the sending of the request message. The request message generating application typically also provides a field to enter a unique identifier of the vehicle device to which the user wants to send the message. For example, the application may provide a list of friends, one or more of which the user may select as recipient, or recipients, of the request message. Or, the application may present a field to manually input a unique identifier, such as, for example, an e-mail address or a cellular telephone number that the application uses as an address to which to send the request message as an SMS message and media message.

At step 215, a central station, such as a TOC described above, receives the request message and attached media content, if any, and processes it according to any protocol conversion that may need to occur. The processing also typically includes retrieving the unique identifier from the request message and information. The application in the initiating smartphone may have selected an individual's name, and possibly the individuals car name, based on user input, but the application would typically also include an e-mail address or cellular telephony number associated with the intended recipient's name and car name (if any). At step 220, the central station searches a subscriber database/table for a subscriber account data record associated with the unique identifier included in the request to meet message.

At step 225, the central station retrieves the matching data record, if any, from the table and queues the request message information and content for transmission to the vehicle. One skilled in the art will appreciate that either only one record exist for the subscriber and the subscriber's vehicle name, or multiple records, or at least multiple unique identifiers, can be associated with the subscriber and his, or her, vehicle. However, the subscriber table preferably should not associate a given unique identifier, or given account identifier, with more than one vehicle.

At step 230, the central station transmits the request message information and content to the intended vehicle device upon a request from the driver of the vehicle requesting pending/queued meeting request messages. The driver may initiate such a request for pending message by activating a voice channel session between the vehicle device, such as a TCU, and a long range wireless network, such as a cellular wireless network. Or, if the vehicle device is a personal smartphone of the vehicle driver, the personal smartphone may include an application that permits information and messages, such as the request to meet message, to automatically 'push' to the personal smartphone. Those skilled in the art understand the term 'push' to mean automatically transmitting and receiving of a message from one device to another without first obtaining a request from the receiving device.

Regardless of the procedure for receiving messages at the vehicle device, the vehicle device receives the meeting request, and attached content, if any, and displays the message as text, displays any image that may have been attached to the message, and plays any audio file that may be attached to the incoming message. Part of the request message typically includes GPS coordinates of the sending user device, and the receiving vehicle device can display these coordinates and associated information using mapping software, and other point of interest software running on the vehicle device. The method ends at step 240.

Figure 3:
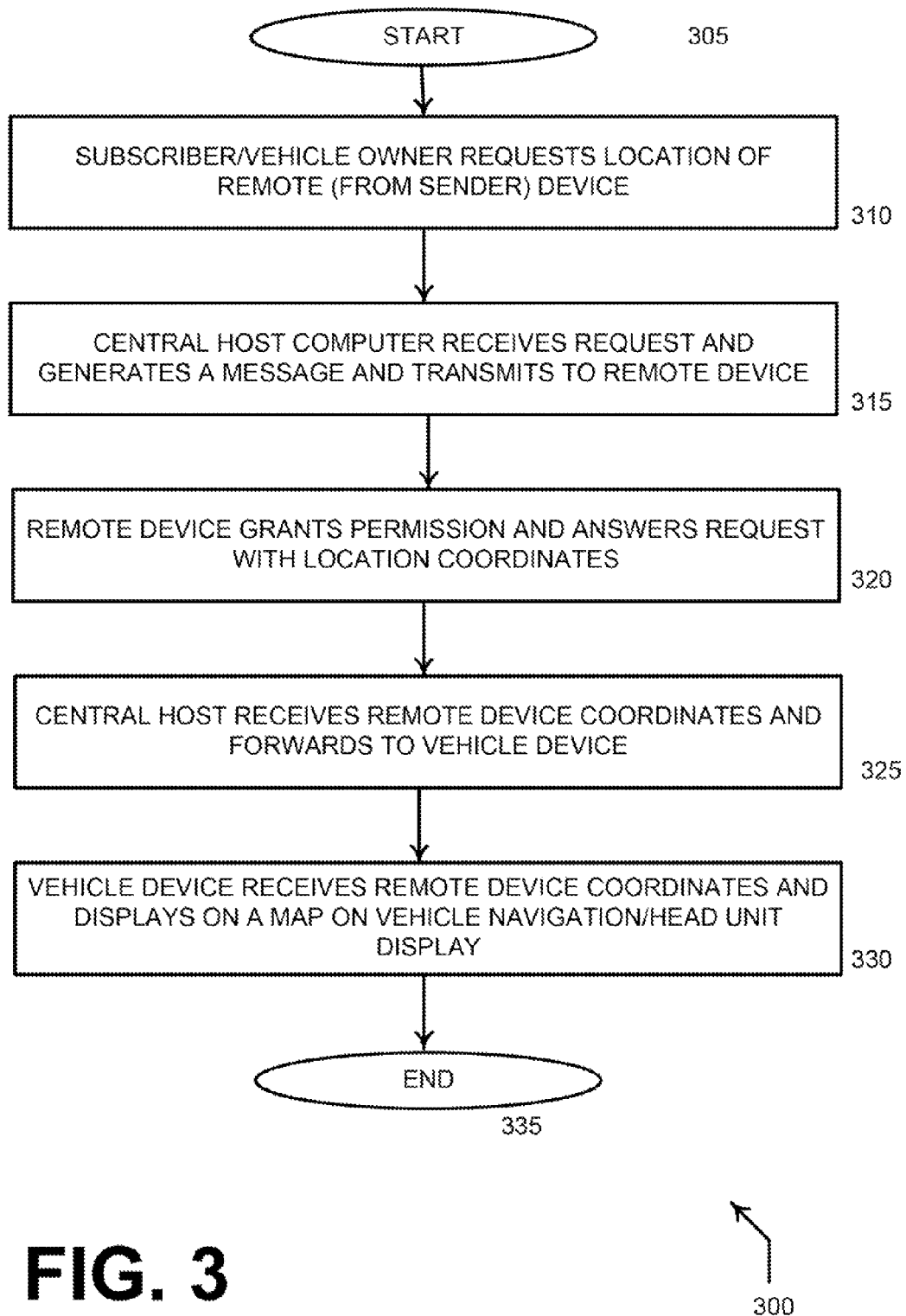

Turning now to FIG. 3, the figure illustrates a flow diagram of a method 300 for requesting the location of a user device to drive to. Method 300 starts at step 305. At step 310, a subscriber of telematics service (a telematics services account is typically associated with a vehicle and ownership thereof) requests the location of a friend that the subscriber wants to drive to in the vehicle associated with the telematics services account. The subscriber may perform the request using a telematics device interface in the vehicle—the requesting device may be a navigation system interface installed in the vehicle and coupled to a communication bus of the vehicle, a smartphone tethered or otherwise coupled to the vehicle's communication/data bus and onboard computer system—or a device, such as a smartphone or PC located remotely from the vehicle and remotely from a device of the individual/friend the subscriber wants to the location of.

The device performing the request steps sends a request message to a central host, for example TOS 10 shown in FIG. 1. The user/subscriber who sends the message typically logs-in to a web site hosted by the TOS, or using an application running on the PC or smartphone that the application configures to accept authentication/log-in credentials of a registered subscriber before sending the request. A request message typically contains a unique identifier associated with the sender's telematics account, which the TOS can use to append useful information, such as, for example, the requester/subscriber's name and vehicle name before forwarding the request message to the intended recipient's user device.

At step 315, the central host forwards the request message, along with any appended information to the device remote from the sender's device and remote from the sender's car. The remote device receives the request message at step 320 and processes it. The result of the processing reveals to the user of the remote device the identity of the request sender and the identity of the sender's car. The remote user may then accept the request using a user interface, such as touching an icon on a touch screen, or pressing button on the remote device, and thereby grant permission for the requestor to drive to the remote user. The remote device sends a confirmation message back to the original sender, which message includes location coordinates of the remote device when it generated the confirmation message.

The central host receives the confirmation message sent from the remote user device at step 325. The central host computer then performs a table lookup in a telematics database table, and determines a contact identifier of the original request sender's car. For example, the contact identifier may be a IMEI, an e-mail address, a text message number, a cellular telephony number, etc. However, typically the central host may determine an e-mail address, SMS text message number etc, only to ultimately direct the confirmation message to the corresponding IMEI of the car device associated with the subscriber/sender of the original request.

At step 330 the vehicle device 4, shown in FIG. 1, receives the confirmation message that includes the location coordinates of the device remote from the original request sender. Typically, the location information includes GPS coordinates determined from signals received from satellite system 15. The vehicle device extracts the location information from the received confirmation message and displays the location coordinate on a display device, which may be built in to the vehicle as part of a head unit, or may be a display on a mobile device that communicates with the vehicle diagnostic buss and on-board computer system when in close proximity to the vehicle. Thus, the original sender sent a request message from a device, that may or may not have been located at the vehicle at the time of sending, but a device at the vehicle receives the confirmation message that the user of the remote device is willing, and desires, for the original sender to have the location information of the remote device user and that same wishes for a display device at the vehicle display the location information on a map, perhaps part of a navigation system of a vehicle, so that the subscriber, driver, original sender can use the displayed location information to facilitate driving to the remote user's location. Method 300 stops at step 335.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for sending a meeting request to a device in a vehicle, comprising;
   receiving a meeting request and information message sent from a user device remote from the vehicle to an intended subscriber device in the vehicle;
   comparing a subscriber unique identifier included in the received meeting request and information message with a subscriber identifier field in a subscriber database;
   retrieving an intended subscriber record from the subscriber database having information in the subscriber identifier field corresponding to the unique identifier included in the received meeting request and information message, wherein the intended subscriber record includes a vehicle device address of the device in the vehicle;
   transmitting request information included in the meeting request and information message to the vehicle device address; and
   receiving from the intended subscriber device a request for notifications of one, or more, meeting request and information messages that user devices remote from the vehicle may have sent;
   wherein the step of transmitting, the request and related information included in the meeting request and information message to the intended vehicle device address includes queuing the request and related information until receipt of the request for notifications, transmitting notifications of meeting request and information messages that user devices remote from the vehicle may have sent; and receiving a request message from the device in the vehicle for meeting requests and related information corresponding to one of the notifications of meeting request and information messages that user devices remote from the vehicle may have sent.

2. The method of claim 1 wherein the device in the vehicle generated the request for notifications substantially simultaneously with a user thereof activating a voice channel between the device in the vehicle and a wireless telephony network.

3. The method of claim 1 wherein the vehicle device is coupled to a communication bus of the vehicle and wherein the vehicle device is configured to communicate with electronic vehicle components and systems that are also coupled to the vehicle communication bus.

4. The method of claim 1 wherein the subscriber unique identifier is an e-mail address.

5. The method of claim 1 wherein the subscriber unique identifier is a user name and wherein the subscriber unique identifier is associated with one, or more, unique device identifiers.

6. The method of claim 5 wherein the one, or more, unique device identifiers include IMEI numbers corresponding to multiple devices.

7. The method of claim 1 wherein the subscriber unique identifier is an SMS number.

8. The method of claim 1 wherein the request information includes a media content file.

9. The method of claim 8 wherein the sending user device recorded the media content file substantially contemporaneously with sending the request message.

* * * * *